(12) United States Patent
Wang et al.

(10) Patent No.: US 9,304,241 B2
(45) Date of Patent: Apr. 5, 2016

(54) BACKLIGHT MODULE AND DISPLAY DEVICE HAVING THE SAME

(71) Applicants: BOE Technology Group Co., LTD., Beijing (CN); Beijing BOE Display Technology Co., LTD., Beijing (CN)

(72) Inventors: Fei Wang, Beijing (CN); Zhanchang Bu, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 0 days.

(21) Appl. No.: 14/095,380

(22) Filed: Dec. 3, 2013

(65) Prior Publication Data

US 2014/0152940 A1    Jun. 5, 2014

(30) Foreign Application Priority Data

Dec. 4, 2012   (CN) .......................... 2012 1 0514859

(51) Int. Cl.
*F21V 8/00*     (2006.01)
*G02F 1/1333*   (2006.01)
*G02F 1/1335*   (2006.01)

(52) U.S. Cl.
CPC ............ *G02B 6/0011* (2013.01); *G02B 6/0085* (2013.01); *G02F 1/133308* (2013.01); *G02B 6/0088* (2013.01); *G02F 2001/133314* (2013.01); *G02F 2001/133628* (2013.01)

(58) Field of Classification Search
CPC .............. G02F 1/133308; G02F 2001/133314; G02F 2001/133317; G02F 2001/133322; G02F 2001/133328; G02B 6/0085; G02B 6/0011; G02B 6/0088
See application file for complete search history.

(56) References Cited

U.S. PATENT DOCUMENTS

2002/0174519 A1*  11/2002  Huang ............................ 16/319
2011/0085107 A1*   4/2011  Noh et al. ....................... 349/61

(Continued)

FOREIGN PATENT DOCUMENTS

| CN | 2581752 Y   | 10/2003 |
| CN | 201572685 U | 9/2010  |
| CN | 202268961 U | 6/2012  |

(Continued)

OTHER PUBLICATIONS

Mao, Chendong, Spring Vibration Damper, Machine Translation of CN 2581752Y from Google Patents website, All Pages.*

(Continued)

*Primary Examiner* — Dennis Y Kim
(74) *Attorney, Agent, or Firm* — Westerman, Champlin & Koehler, P.A.

(57) ABSTRACT

A backlight module includes: a frame; a backboard configured to support the frame; a radiator provided in the backboard and connected to an inner wall of the frame; a light source fixed to an inner wall of the radiator; a light guide plate relatively slidably mounted on the radiator and configured to guide light emitted by the light source; and at least one buffer mounted on the radiator and configured so that the radiator is moveable relative to the backboard against an elastic force of the buffer. The backlight module can effectively eliminate the phenomenon in which a shadow of the light source is present in pictures coming from the backlight module since the light guide plate presses against the light source after it is heated to expand. The present invention further provides a display device including the above backlight module.

13 Claims, 3 Drawing Sheets

(56) References Cited

U.S. PATENT DOCUMENTS

2011/0157844 A1* 6/2011 Chan et al. .................. 361/749
2012/0128197 A1* 5/2012 Li et al. ....................... 381/395

FOREIGN PATENT DOCUMENTS

| CN | 102563454 A | 7/2012 |
| CN | 102601199 A | 7/2012 |
| CN | 102734713 A | 10/2012 |
| CN | 102798042 A | 11/2012 |

OTHER PUBLICATIONS

First Chinese Office Action for Chinese Patent Application No. 201210514859.5, dated Jun. 20, 2014, 10 pages.
Second Chinese Office Action for Chinese Patent Application No. 201210514859.5, dated Nov. 15, 2014, 18 pages.

* cited by examiner

BACKLIGHT MODULE AND DISPLAY DEVICE HAVING THE SAME

CROSS-REFERENCE TO RELATED APPLICATION

This application claims the benefit of Chinese Patent Application No. 201210514859.5 filed on Dec. 4, 2012 in the State Intellectual Property Office of China, the whole disclosure of which is incorporated herein by reference.

BACKGROUND OF THE INVENTION

1. Field of the Invention

Embodiments of the present invention relate to a technical filed of display backlight, and more particularly, to a backlight module and a display device having the same.

2. Description of the Related Art

A backlight module is one key part of a liquid crystal display device. Since a liquid crystal does not emit any light itself, a main function of the backlight module is to be used as a light source for providing a uniform, high luminance illumination for a liquid crystal panel. A basic principle of the backlight module is in that it converts dot or line light beam emitted from a common dot or line shaped luminous body into plane beam having high luminance and uniform gray scale through an effective optical mechanism, so that the liquid crystal panel can display images normally. In addition to applications in a liquid crystal TV and a liquid crystal display device, the backlight module can be applied to display devices such as a digital photo frame, an electronic paper, a mobile telephone, and the like which need backlight.

As shown in FIG. 1, a backlight module in prior art generally includes a frame 01, a backboard 05 provided below the frame 01, a radiator 04 provided above and fixedly connected to the backboard 05, a light source 02 provided on a side wall of the radiator 04, and a light guide plate 03 provided above the radiator 04. In general, a gap between the light guide plate 03 and the light source 02 would be reduced as small as possible in order to ensure a light incidence rate of the light guide plate 03. During operation of the backlight module, however, there is some heat loss for the light source 02 while emitting, and the light guide plate 03 adjacent to the light source will be heated to expand, and thereby may contact with and press against the light source 02. The light guide plate 03 will be heavily heated and even melted with heat when pressing against the light source 02, so that a shadow of the light source will be present in pictures coming from the backlight module, thereby affecting a normal operation of the whole backlight module.

SUMMARY OF THE INVENTION

In view of the above, a first object of the present invention is to provide a backlight module which can effectively avoid the light source from being pressed by the light guide plate after the light guide plate is heated to expand.

A second object of the present invention is to provide a display device including the above backlight module.

According to an embodiment of one aspect of the present invention, there is provided a backlight module, including: a frame;

a backboard configured to support the frame;

a radiator provided in the backboard and connected to an inner wall of the frame;

a light source fixed to an inner wall of the radiator;

a light guide plate relatively slidably mounted on the radiator and configured to guide light emitted by the light source; and at least one buffer mounted on the radiator and configured so that the radiator is moveable relative to the backboard against an elastic force of the buffer.

According to an embodiment of a further aspect of the present invention, there is provided a display device, including a display screen, and the backlight module as mentioned in the above embodiment, wherein the display screen is supported on the frame of the backlight module.

BRIEF DESCRIPTION OF THE DRAWINGS

In order to explain the technical solutions in the embodiments of the present invention or in the prior art more explicitly, the figures for the embodiments of the present invention or the prior art will be introduced briefly below. The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
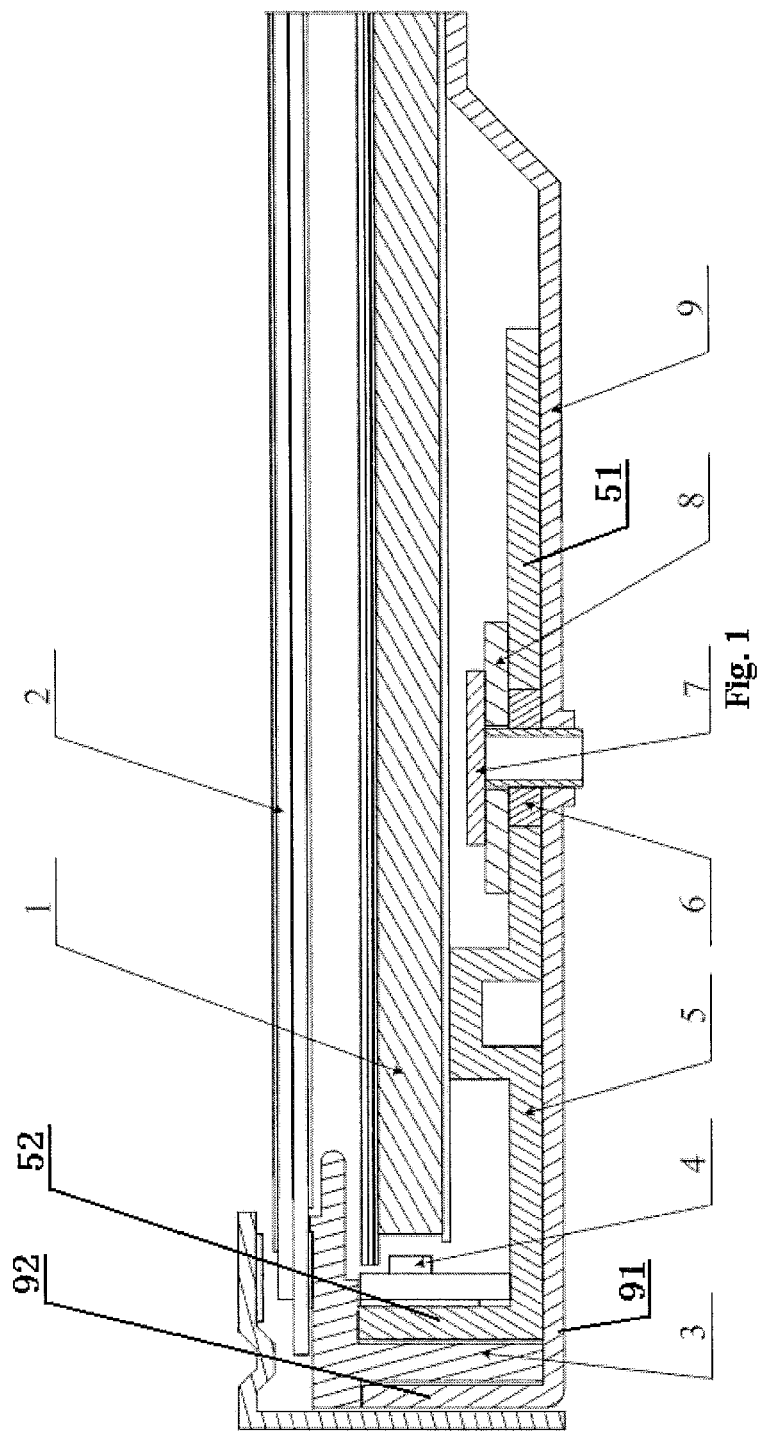
FIG. 1 is a partial side view of a backlight module in prior art.

A first object of the present invention is to provide a backlight module which can effectively eliminate the phenomenon in which a shadow of the light source is present in pictures coming from the backlight module since the light guide plate presses against the light source after it is heated to expand, and a second object of the present invention is to provide a display device including the above backlight module.

Exemplary embodiments of the present invention will be described hereinafter in detail with reference to the attached drawings, wherein the like reference numerals refer to the like elements. The present invention may, however, be embodied in many different forms and should not be construed as being limited to the embodiment set forth herein; rather, these embodiments are provided so that the present invention will be thorough and complete, and will fully convey the concept of the disclosure to those skilled in the art.

Figure 2:
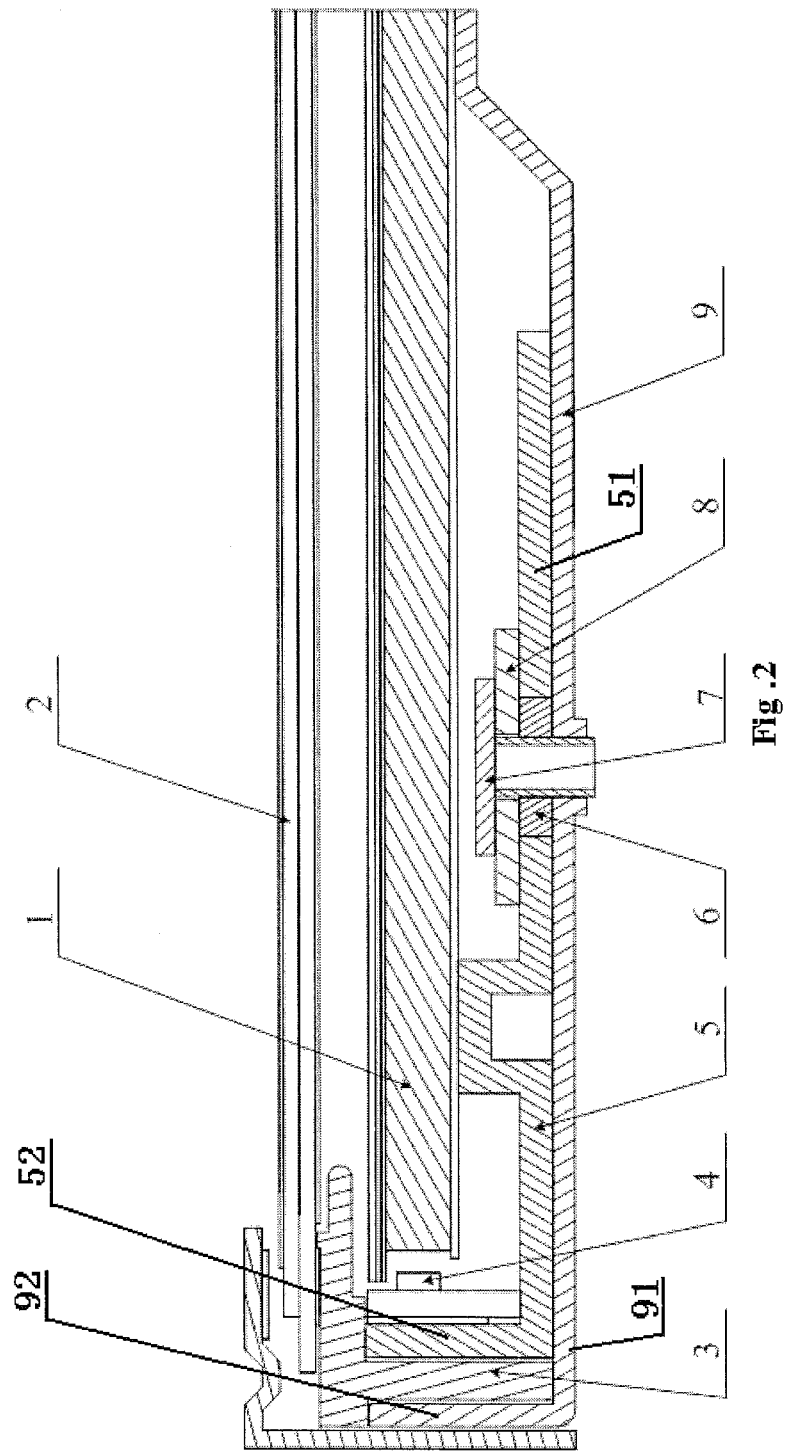
FIG. 2 is a partial cross-sectional view of a backlight module according to an exemplary embodiment of the present invention.
Figure 3:
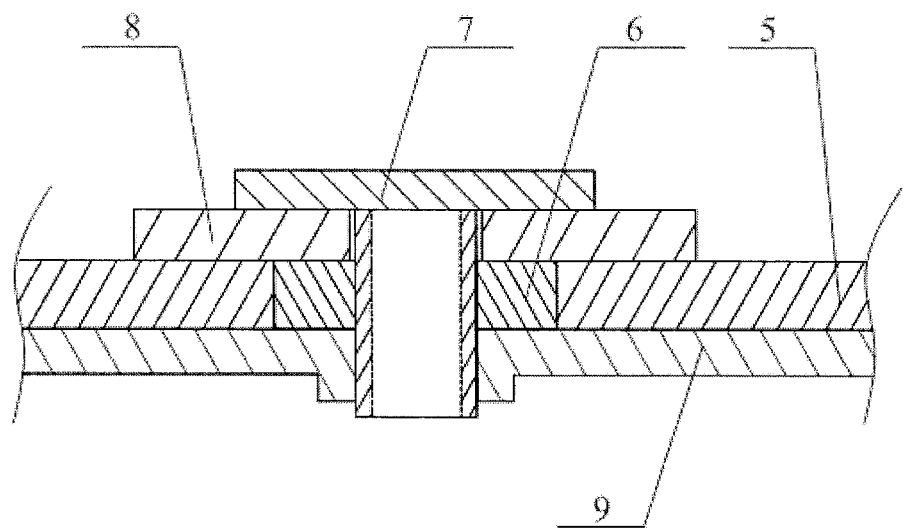
FIG. 3 is a cross-sectional view showing engagements between a radiator, a bolt and a flexible gasket of a buffer according to an exemplary embodiment of the present invention.
Figure 4:
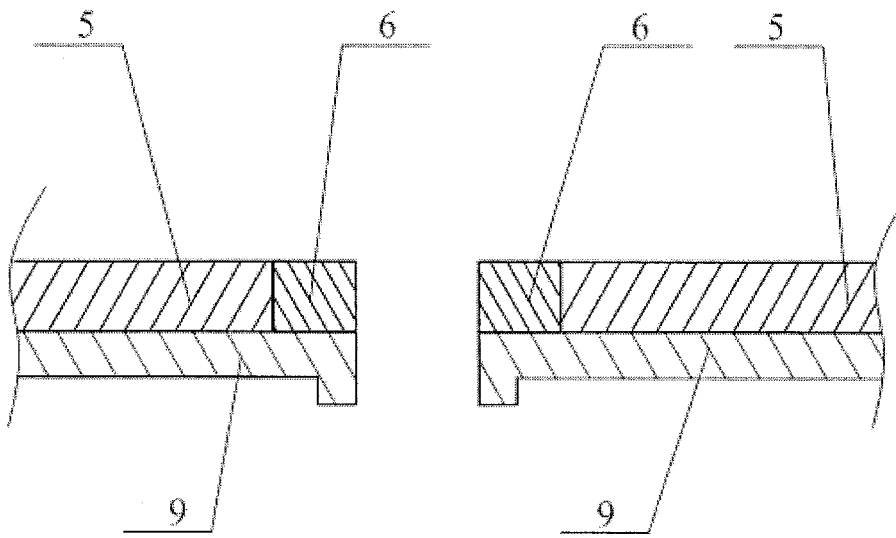
FIG. 4 is a cross-sectional view showing an engagement between the radiator and the flexible gasket shown in FIG. 3.

With reference to FIG. 2 to FIG. 4, a backlight module according to an exemplary embodiment of the present invention includes: a frame 3 for supporting a display screen; a backboard 9 configured to support the frame 3; a radiator 5 provided in the backboard 9 and connected to an inner wall of the frame 3; a light source 4 fixed to an inner wall of the radiator 5; a light guide plate 1 relatively slidably mounted on the radiator 5 and configured to guide light emitted by the light source 4; and at least one buffer mounted on the radiator 5 and configured so that the radiator 5 is movable relative to the backboard 9 against an elastic force of the buffer.

Specifically, with reference to FIG. 2, in one exemplary embodiment of the present invention, the backboard 9 comprises a first body 91 and a first vertical wall 92 extending vertically from a periphery of the first body 91. The radiator 5 includes a second body 51 mounted on the first body 91 and a second vertical wall 52 extending vertically from one edge of the second body 52. A portion of the frame 3 is clamped between the first vertical wall 92 and the second vertical wall 52. The the backboard 9 is provided below the frame 3, and the radiator 5 is provided above the first body 91 of the backboard 9 and inside of frame 3. The light source 4 is fixed to an inner wall of the second vertical wall 52 of the radiator 5, and light guide plate 1 is provided above the radiator 5 and moveable relative to the radiator 5.

According to one exemplary embodiment of the present invention, each buffer includes a bolt 7 by which the radiator 5 is provided on the backboard 9 and a flexible gasket 6 provided between a screw rod of the bolt 7 and the radiator 5. A receiving hole for receiving the flexible gasket 6 is provided in a portion of the radiator 5 where the bolt 7 is mounted. The receiving hole is formed in the second body 51 of the radiator 5.

In the backlight module according to an embodiment of the present invention, at least one buffer is mounted on the radiator 5, and the radiator 5 can be moved relative to the backboard 9 against an elastic force of the buffer. As such, a contraction of the buffer can absorb a pressing force generated by a deformation of the light guide plate 1 due to heat, so that a distance between the light guide plate 1 and the light source 4 is kept substantially constant.

Specifically, the flexible gasket 6 is provided between a screw rod of the bolt 7 and the radiator 5, and since the flexible gasket 6 can be compressed and deformed under an external force, the light guide plate 1 will apply a pressing force on the light source 4 when the light guide plate 1 is expanded after being heated and thus presses against the light source 4. Since the light source 4 is fixed on the radiator 5, the pressing force will be transmitted to the radiator 5 so that the radiator 5 presses against the flexible gasket 6, and the flexible gasket 6 is compressed and deformed under the pressing force. Finally, the radiator 5 is displaced with respect to the backboard 9 and the light guide plate 1 in a direction in which the light guide plate 1 is expanded, thereby reducing the pressing force applied on the light source 4 by the light guide plate 1. In this way, the backlight module of the present invention can avoid presence of a shadow of the light source in pictures coming from the backlight module, which will disadvantageously affect a normal operation of the whole backlight, when the light guide plate 1 is heated to expand. A temperature of the light guide plate 1 is decreased as that of the light source 4 is decreased, so that the light guide plate 1 is reduced in its amount of expansion and resumed in its size, and then a size of the flexible gasket 6 is also resumed, thereby causing the radiator 5 to return back its original position. Thus, the radiator 5 can be well fixed when the flexible gasket 6 is not subject to any external force.

In an exemplary embodiment, in order to improve an availability of light ray of the light source as great as possible, even a gap between the light source 4 and the light guide plate 1 can be set as zero.

In a further embodiment, the flexible gasket 6 may be made of silica gel, since the silica gel has a better thermal stability, more stable chemical properties, and a higher mechanical strength, the present invention, however, is not limited to this. In an alternative embodiment, a gasket made of other materials, such as a foam gasket, may be used.

In a further exemplary embodiment, in order to fix the position of the radiator 5 in an axial direction of the bolt 7, a washer 8 may be provided between a screw cap of the bolt 7 and an upper surface of the radiator 5. Since the washer 8 will be moved relative to the radiator 5 during displacement of the radiator 5, a friction coefficient of the washer 8 should be selected as small as possible. An ABS (Acrylonitrile Butadiene Styrene) plastic washer or a nylon washer may be selected. In an exemplary embodiment of the present invention, the ABS plastic washer, which has better resistance to impact, better heat resistance and better resistance to low temperature, is used.

In addition, in order to ensure a flatness of the radiator 5 so that light conduction of the backlight module will be not affected, a plurality of buffers may be arranged uniformly on the first body 91 of the backboard 9, and a plurality of bolts 7 of the plurality of buffers are also uniformly arranged on the radiator 5.

In the present embodiment, the light source 4 can be fixed to the radiator 5 by the bolt 7 so as to facilitate assembly and disassembly of the light source 4. With this configuration, the light source 4 can be conveniently replaced when the light source 4 is damaged. Of course, the light source 4 may also be affixed to the radiator 5, and no limitation is made to this herein.

In an exemplary embodiment, the radiator 5 may be made of aluminum since aluminum has a better thermal conductivity. It goes without saying that the radiator may be made of other materials having a better thermal conductivity, and no limitation is made to this herein.

The embodiment in which the buffer including the flexible gasket 6 is provided on the second body 51 of the radiator 5 is described above, but the present invention is not limited to this. In an alternative embodiment, the buffer is provided between the second vertical wall 52 of the radiator 5 and a vertical portion of frame 3. The buffer may be formed as a flexible pad, which is adhered between the second vertical wall 52 of the radiator 5 and the vertical portion of frame 3 by, for example, an adhesive. Further, such a flexible pad may be made of silica gel or foam.

In the backlight module of the present embodiment, the flexible pad, which is used as the buffer, is provided between the second vertical wall 52 of the radiator 5 and the vertical portion of frame 3, and since the flexible pad can be compressed and deformed under an external force, the light guide plate 1 will apply a pressing force on the light source 4 when the light guide plate 1 is expanded after being heated and thus presses against the light source 4. Since the light source 4 is fixed on the radiator 5, the pressing force will be transmitted to the radiator 5 so that the radiator 5 presses against the flexible pad, and the flexible pad is compressed and deformed under the pressing force. Finally, the radiator 5 is displaced with respect to the backboard 9 and the light guide plate 1 in a direction in which the light guide plate 1 is expanded, thereby reducing the pressing force applied on the light source 4 by the light guide plate 1. In this sway, the backlight module of the present invention can avoid presence of a shadow of the light source in pictures coming from the backlight module, which will disadvantageously affect the normal operation of the whole backlight, when the light guide plate 1 is heated to expand. A temperature of the light guide plate 1 is decreased as that of the light source 4 is decreased, so that the light guide plate 1 is reduced in its amount of expansion and resumed in its size, and then a size of the flexible gasket 6 is also resumed, thereby causing the radiator 5 to return back its original position.

Based on the backlight module provided in the above embodiments, as shown in FIG. 2, the present invention further provides a display device, which includes a display screen 2 and the backlight module as mentioned in the above embodiments, wherein display screen 2 is supported on the frame 3 of the backlight module. Since display device employs the backlight module of the above embodiments, the display device can achieve the advantage effects generated in the above various embodiments.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A backlight module, including:
   a frame;
   a backboard directly connected to the frame to support the frame;
   a radiator provided in the backboard and connected to an inner wall of the frame;
   a light source fixed to an inner wall of the radiator;
   a light guide plate relatively slidably mounted on the radiator and configured to guide light emitted by the light source;
   at least one buffer mounted on the radiator,
   wherein each buffer includes a bolt by which the radiator is provided on the backboard and a flexible gasket provided between a screw rod of the bolt and the radiator, a receiving hole for receiving the flexible gasket is provided in a portion of the radiator where the bolt is mounted, and
   there is further provided a washer between a screw cap of the bolt and the radiator, and
   a flexible pad provided between a vertical wall of the radiator and a vertical portion of the frame,
   wherein the light guide plate is constructed to apply a pressing force on the light source when the light guide plate is expanded after being heated, the pressing force is transmitted to the radiator, the flexible pad and the flexible gasket is compressed and deformed by the radiator while the radiator is displaced with respect to the backboard and the light guide plate in a direction in which the light guide plate is expanded, so that a contraction of the flexible pad and the flexible gasket absorb the pressing force generated by a deformation of the light guide plate due to heat.

2. The backlight module according to claim 1, wherein the flexible gasket is made of silica gel or foam.

3. The backlight module according to claim 1, wherein the washer is made of ABS or nylon.

4. The backlight module according to claim 1, wherein the buffer is uniformly distributed on the radiator.

5. The backlight module according to claim 1, wherein the light source is fixed on the radiator by bolts.

6. The backlight module according to claim 1, wherein the radiator is made of aluminum.

7. The backlight module according to claim 1, wherein,
   the backboard includes a first body and a first vertical wall extending vertically from a periphery of the first body;
   the radiator includes a second body mounted on the first body and the vertical wall extending vertically from one edge of the second body; and
   the vertical portion of the frame is clamped between the first vertical wall and the vertical wall.

8. The backlight module according to claim 7, wherein the receiving hole is formed in the second body of the radiator.

9. A display device, including:
   a display screen; and
   a backlight module, the display screen being supported on the frame of the backlight module and the backlight including:
   a frame;
   a backboard directly connection to the frame to support the frame;
   a radiator provided in the backboard and connected to an inner wall of the frame;
   a light source fixed to an inner wall of the radiator;
   a light guide plate relatively slidably mouted on the radiator and configured to guide light emitted by the source;
   at least one buffer mounted on the radiator,
   wherein each buffer includes a bolt by which the radiator is provided on the backboard and a flexible gasket provided between a screw rod of the bolt and the radiator, a receiving hole of receiving the flexible gasket is provided in a portion of the radiator where the bolt is mounted, and
   there is further provided a washer between a screw cap of the bolt and the radiator; and
   a flexible pad provided between a vertical wall of the radiator and a vertical portion of the frame,
   wherein the light guide plate is constructed to apply a pressing force on the light source when the light guide plate is expanded after being heated, the pressing force is transmitted to the radiator, the flexible pad and the flexible gasket is compressed and deformed by the radiator while the radiator is displaced with respect to the backboard and the light guide plate in a direction in which the light guide plate is expanded, so that a contraction of the flexible pad and the flexible gasket absorb the pressing force generated by a deformation of the light guide plate due to heat.

10. The display device according to claim 9, wherein the flexible gasket is made of silica gel or foam.

11. The display device according to claim 9, wherein the buffer is uniformly distributed on the radiator.

12. The display device according to claim 9, wherein,
   the backboard includes first body and a first vertical wall extending vertically from a periphery of the first body;
   the radiator includes a second body mounted on the first body and the vertical wall extending vertically from one edge of the second body; and
   the vertical portion of the frame is clamped between the first vertical wall and the vertical wall.

13. The display device according to claim 12, wherein the receiving hole is formed in the second body of the radiator.

* * * * *